219-121 SR
9/25/84 OR 4,473,736

United States Patent [19]

Bloyet et al.

[11] Patent Number: 4,473,736

[45] Date of Patent: Sep. 25, 1984

[54] PLASMA GENERATOR

[75] Inventors: Emile Bloyet; Philippe Leprince, both of Gif Sur Yvette; Jean Marec, Limours, all of France

[73] Assignee: Agence Nationale de Valorisation de La Recherche (Anvar), France

[21] Appl. No.: 251,063

[22] Filed: Apr. 6, 1981

[30] Foreign Application Priority Data

Apr. 10, 1980 [FR] France ................................ 80 08073

[51] Int. Cl.[3] ................................................ B23K 9/00

[52] U.S. Cl. ...................... 219/121 PM; 219/121 PR; 219/121 P; 219/10.55 R; 313/231.31; 315/111.21

[58] Field of Search ................. 219/121 PR, 121 PM, 219/121 P, 121 PL, 10.55 R; 313/231.31; 315/111.5, 111.2; 204/164

[56] References Cited

U.S. PATENT DOCUMENTS

| | | | |
|---|---|---|---|
| Re. 29,304 | 7/1977 | Greenfield et al. | 219/121 P |
| 3,171,009 | 2/1965 | Scheller et al. | 219/10.55 R |
| 3,588,594 | 6/1971 | Yamamoto | 219/121 PR |
| 3,903,891 | 9/1975 | Brayshaw | 313/231.31 |
| 3,922,214 | 11/1975 | Van Cakenberghe | 219/121 PL |
| 3,980,855 | 9/1976 | Boudouris et al. | 219/10.55 R |
| 4,207,452 | 6/1980 | Arai | 219/10.55 R |
| 4,230,448 | 10/1980 | Ward et al. | 219/10.55 R |

*Primary Examiner*—M. H. Paschall
*Attorney, Agent, or Firm*—Kane, Dalsimer, Kane, Sullivan and Kurucz

[57] ABSTRACT

A plasma generator comprises a metallic tube of small diameter inside which can circulate a gas such as argon at a small flow rate, which is discharged at the front end of the tube. The tube is coupled with an energizing structure which can comprise a frequency generator supplying electromagnetic microwaves, via a coaxial connection, a coupling structure allowing the transfer of the energy of the generator to the front portion of the metallic tube. In the absence of a gas current in the tube, the front portion radiates the energy transmitted to it in the manner of an antenna. When a gas is discharged at the end of the tube, said energy allows maintaining a plasma in front of the latter.

This plasma generator device is usable in many applications, such as a blowtorch a light source or torch usable in spectrography, a plasma motor or an ion source.

19 Claims, 3 Drawing Figures

PLASMA GENERATOR

FIELD OF THE INVENTION

The present invention is directed to a plasma generator, notably a plasma blowtorch.

BACKGROUND OF THE INVENTION

It is known that plasmas are gases ionized at very high temperatures, of the order of several thousands of degrees. It has already been proposed to use them in industry for making blowtorches notably for carrying out surface treatments.

A plasma can be obtained by the energization, through an electric field, of a gas enclosure, such as the inside a tube.

A plasma blowtorch is also known in which an electric field is generated by using an inductance surrounding a tube in which circulates a gas flow to be energized and which is supplied with a high frequency or ultra-high frequency alternating current of the order of 20 to 50 MHz. The inductance encompasses a tube made of an insulating material such as glass, inside which is formed a plasma. The formation of plasma inside a tube limits, however, the use of said blowtorches to the treatment of parts of reduced dimensions which can be introduced inside the tube. The low value of the energy density of the plasma obtained limits also the field of application of this blowtorch. Finally, the tube has the disadvantage of being fragile and costly.

Plasmas of higher energy density can be obtained at the outlet of a metallic tube by using electric arc blowtorches which is generated an electric field radially between a central cathode placed inside the tube and the tube itself which forms an anode for creating an electric arc which is blowed by the gas to be ionized towards the outlet of the tube. However, this blowtorch has disadvantages which limit its applications; in particular, the plasma thus produced contains unavoidably impurities from the electrodes and these impurities may be undesirable for a surface treatment. Moreover, the operating costs of said blowtorches are high since the electrodes deteriorate rapidly and the gas flow is high.

OBJECTS AND SUMMARY OF THE INVENTION

The plasma generator according to the invention has the advantages of the known blowtorches without exhibiting their disadvantages.

According to the invention, a gas to be energized is made to flow in a metallic tube the end portion of which is formed with an opening for the discharge of said gas. The tube is supplied preferably with an ultra-high or micro-wave alternating electric current of frequency equal to at least 100 MHz through an energizing structure allowing the end portion of the latter to radiate in electromagnetic form a portion at least of the energy transmitted to it. When the gas is discharged at the end of the metallic tube, it has been established that said end does not radiate electromagnetic waves, but that the energy transferred to it is used exclusively, or almost exclusively, for energizing the gas and transforming it into a plasma which is in the form of a flame localized in a small area at the output of the tube.

The device according to the invention allows, when applied to the plasma blowtorch combining the advantages of the prior art plasma blowtorches without their disadvantages One is free from the necessity of using a tube made of glass or any other insulating material adapted for withstanding high temperatures. It is not indispensable that the end of the metallic tube where the flame is formed is surrounded by the feeding generator of the antenna. This flame can then be used as that of a standard gas combustion blowtorch. Finally, the degree of purity of the plasma obtained is very high and its energy density is high.

When using an energy supply in the ultra-high frequency range, good results are obtained where the inner diameter of the metallic tube is of the order of 0.5 to 2 mm; the length of the flame is then of the order of one centimeter. Thus, the flame has small dimensions and the energy density of the plasma forming it is of the order of 20 KW per $cm^3$, viz. about four times the energy density obtained with the first plasma blowtorch hereabove mentioned.

It has also been established that the efficiency of the device, viz. the ratio between the energy produced by the ultra-high frequency generator and the energy of the obtained plasma is very close to 100%.

BRIEF DESCRIPTION OF THE DRAWINGS

Further features of the invention will become more apparent from the description of some of its embodiments, with reference to the accompanying drawings wherein.

DETAILED DESCRIPTION OF THE EMBODIMENTS

Figure 1:
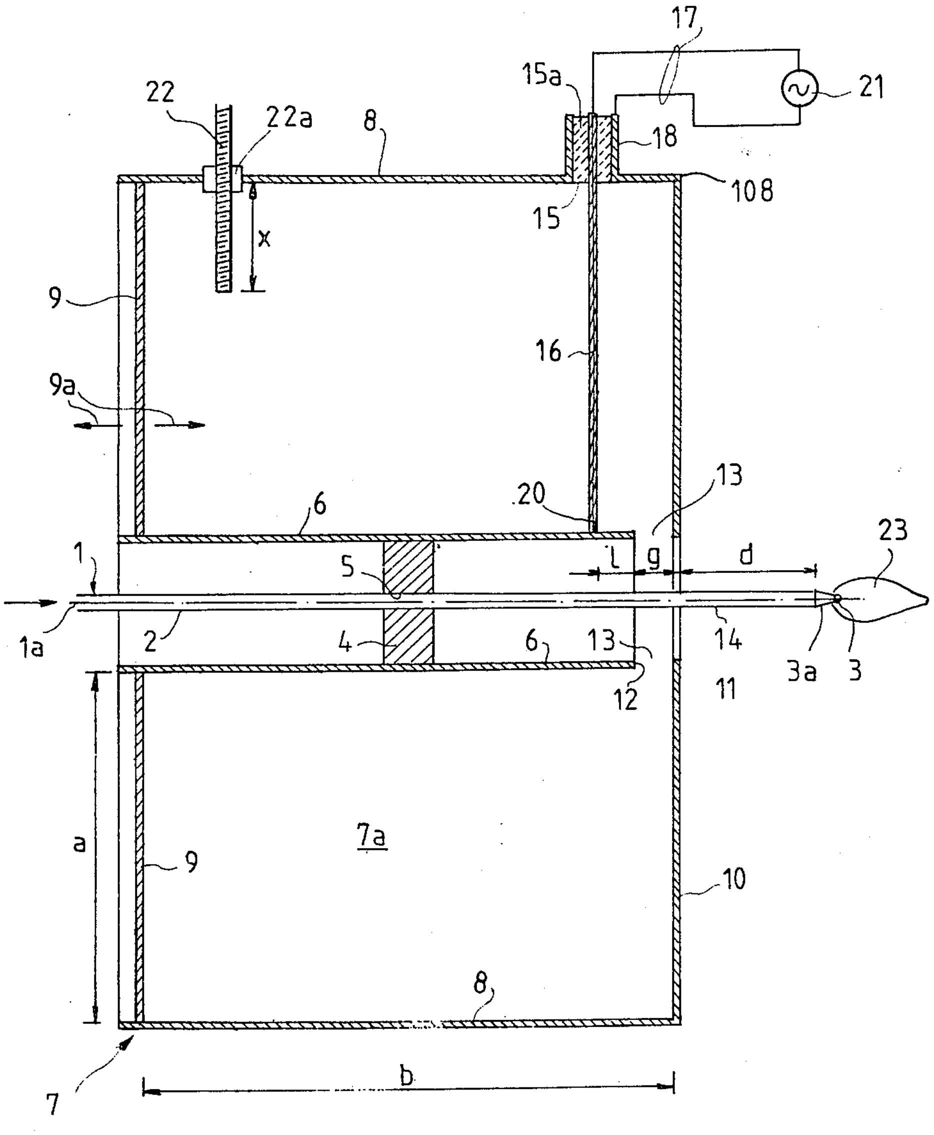
FIG. 1 is a cross-sectional axial and schematic view of a plasma generator according to the invention.

Reference is first made to FIG. 1.

A rectilinear tube 1, of axis 1*a*, made of a good electrically conductive material, for example a metal such as copper, aluminum, steel, etc., is connected via its rear end 2 to a supply, now shown, of a gas such as argon. It has a front end 3 formed with an opening through which can be discharged the gas flowing inside the tube.

Around the tube 1, the inner diameter of which is between 0.5 and 2 mm, is mounted a metallic ring or washer 4, the thickness of which, in the axial direction, is of the order of 5 mm and is formed with an inner opening 5 the diameter of which is slightly more than the outer diameter of the tube 1 so that the ring can slide on the tube while maintaining a conductive contact with the latter.

Said ring 4, the periphery of which has an outer diameter of the order of a centimeter, is also slidably mounted inside a metallic tube or sleeve 6, coaxial with tube 1 and forming the inner wall of a hollow metallic ring 7 the outer wall of which is formed by a second cylindrical metallic sleeve 8 of circular section, coaxial with tube 1. The cavity 7*a* defined inside the hollow ring 7 is closed at its rear end by a metallic plate or flange 9 perpendicular to axis 1*a* and connecting tubes 6 and 8. In an embodiment, the plate is slidably mounted about sleeve 6 and inside sleeve 8 parallel to axis 1*a* as shown by arrow 9*a*, while maintaining a conductive contact with sleeves 6 and 8. At its front end, the cavity 7*a* is bounded by a second flat metallic flange 10 in the shape of a crown, also perpendicular to axis 1*a*. The flange 10 is connected all around its periphery 108 with the front end of cavity 8. It is formed with a central opening 11, having a diameter substantially equal, in this example, to the diameter of the tube or sleeve 6. The crown-shaped flange 10 is not connected to the front end 12 of tube 6, a gap 13 of axial length g of a few millimeters, for example of 1.6 mm, being provided between said end 12 and the edge of flange 10 around the opening 11. The tube 1 extends beyond the end 12 and through the opening 11 and is formed with an end portion 14 protruding outside ring 7. The front end 3 of the tube is positioned at a distance d, for example of about 5 mm, in front of the plane of opening 11.

In the vicinity of its front end, the outer tube or sleeve 8 is formed with an opening in the shape of a funnel 15 and closed by an insulating plug 15*a* providing a passage for the central conductor 16 or core of a coaxial cable 17 whose outer conductor or sheath 18 is welded, or connected in any other way, to the tube 8 around opening 15. The central conductor 16 extends through the inner cavity 7*a* or ring 7. Its end 20 is connected for example by welding with the inner tube 6 in the vicinity, in the axial direction, of gap 13, i.e. at a small distance l of end 12.

As an alternative, the end 20 of conductors 16, instead of being welded to tube 6, could be welded to a small metallic plate (not shown) placed at a small distance opposite, but not in contact with, the outer wall of the tube or sleeve 6 inside ring 7.

Conductors 16 and 18 are connected to the two output terminals of an ultra-high frequency generator 21.

A threaded rod 22 extends radially through the wall of tube 8 in the vicinity of plate 9, via a socket 22*a*, tapped inside, which allows adjusting the penetration depth x, in the radial direction, of said rod 22 inside cavity 7*a* of ring 7. Said cavity is normally filled with air, as well as the inside of the tube or sleeve 6. It could contain another dielectric medium.

When feeding the coaxial cable 17 from generator 21 with an electrical voltage of a frequency of one or several gigahertz and when gas such as argon is made to flow inside tube 1, at a small rate, it is possible to generate, by a very simple activation operation, the formation of a plasma at the outlet of the opening at the end 3 of tube 1, which is maintained as long as the energization from generator 21 is maintained. For obtaining the activation, an operator needs only to bring in contact the end 3 of tube 1 with a metallic part and then withdraw it so that a micro-spark flashes, thereby initiating the formation of the plasma. Said plasma is maintained in the shape of a small frame 23, one or a few centimeters long, in the air in front of end 3 as long as the gas flow and the energization of source 21 are maintained. It has been established in particular that the front end of tube 1 is subjected to very little warming up in the presence of the plasma, which is the evidence of a very good transformation efficiency of the energy conveyed by the tube to the plasma. A generator of the type shown in FIG. 1 has been tested by supplying it with powers varying from 15 W to 500 Watts. The losses due to reflections and electromagnetic radiations of the energy delivered to the device with have been measured did not exceed 5% of the energy supplied.

While a complete scientific analysis of the reasons why a metallic tube such as is shown in FIG. 1 allows obtaining a high energy density plasma 23 in a small volume cannot be proposed, it can nevertheless be stated that, in the absence of gas being discharged at the end of the tube, the device behaves as an antenna structure, the end 3 of the tube 1 forming the radiating portion. An ultra-high frequency energy is transmitted by the coaxial cable 17 to the hollow ring 7, the latter forming a coupler allowing transferring said energy to the radiating system formed at the end of the front portion 14 of tube 1. A high electrical field prevails in gap 13 between the front end of sleeve 6 and flange 10. The energy contained in said gap 13 is transferred to the outside and particularly at the front portion 14 of the tube due to the opening 11 the dimension of which is determined for facilitating said energy transfer.

It is important to note that the hollow annular structure 7 is not a cavity resonator, i.e. adapted for operating only at a frequency relatively well determined, but that it provides an impedance matching means and allows an energy transfer by coupling in a frequency range which can easily vary by 20% or more around the nominal frequency. For example, with a nominal frequency of 2450 MHz, such a coupler can operate without difficulty within a range of 2000 to 2800 MHz, which could not do a cavity resonator. In particular, it is noted that, contrary to the latter, the overvoltage coefficient which can be measured in cavity 7*a* hardly exceeds 4 in the example shown. This is in particular the result of the positioning of the connecting point of coaxial cable 17 applying the energy, in the vicinity of flange 10.

The device looses its antenna quality when a plasma is formed at the end 3 of the front portion 14 of tube 1. The apparition of a spark causes actually the liberation of electrons in the gaseous medium at the outlet of the tube, which are very strongly accelerated by the electrical field prevailing at the outlet of said tube and cause, by their multiple collisions with the ambient gas molecules, the formation of extra ions until a state of ionic discharge in equilibrium is established, in which the formed plasma absorbs a very large portion of the electromagnetic energy issued from tube 1.

If the plasma is to be formed and maintained under good conditions and a good efficiency, it is necessary that the maximum energy is transferred by the coupler provided by the hollow ring 7 to tube 14 via gap 13. Said coupler provides an impedance adaptation of the plasma generator with the impedance of the coaxial energy supply cable 17.

In practice, it has been established that the plasma generator impedance was varying strongly with that of the plasma itself. The latter depends of a very high number of factors such as the ionizing energy of the gas used, the pressures to which the latter is subjected, etc. It is known however that such an impedance is substantially resistive at a high pressure, such as the atmospheric pressure, and varies appreciably with the power consumed by said plasma, and in fact with the volume of said plasma. For each power configuration of the ultra-high frequency generator 21, one can therefore carry out a regulation of the impedance of the coupler formed by the hollow ring 7.

Several arrangements can be used to this effect. In particular, it has been established that the displacement of washer 4 in the annular gap between tubes 1 and 6 allowed varying the efficiency of the device, that is obtaining, for a determined power supplied by generator 21, a maximum power of the plasma at the end 3 of tube 1.

Another means for adapting the impedance of the hollow ring coupler 7 consists in varying the penetration depth x of the threaded rod 22. Another means consists also in changing the position of plate 9 which closes the rear end of the cavity or enclosure bounded by sleeves 6 and 8, parallel to arrow 9*a*.

Good results have been observed when the following relation is satisfied:

$$2(a+b)=\lambda/2$$

In this formula, a is the difference between the radius of tube 8 and that of tube 6, b is the axial length of ring 7, viz. the distance between the plates or flanges 9 and 10, and $\lambda$ the wave-length of the current produced by the generator 21.

In an embodiment of the plasma generator just described, there is provided a blowtorch in which is used a flame 23 at the end of tube 3 for increasing the temperature of a part attacked by said flame. The frequency of the current produced by the ultra-high frequency generator 21 is of 2450 MHz, the inner diameter of tube 1 is of the order of 0.5 to 2 mm, the outer diameter of tube 6 is of the order of a centimeter, the parameters a and b have respective values of 12.5 mm and 20 mm, the axial length g of gap 13 between crown 10 and end 12 of tube 6 is of the order of a few millimeters, and the length d of the protrusion 14 of tube 1 outside ring 7 is also of the order of a centimeter. The flow rate of the gas discharged from tube 1 which, in this example, is argon, is between 0.2 and a few liters per minute. Argon is a gas possessing a high ionizing potential and is inert even at a high temperature with respect to a very large number of surfaces to be possibly treated.

With this embodiment, the power density of plasma 23 is of the order of 20 kW/cm$^3$ if the power of generator 21 is of the order of 200 W.

Thus, the plasma 23 can be used, due to its thermal properties, as a "micro-blowtorch" for carrying out surface treatments, weldings, etc. The flame 23 can also be used as a torch or light source in a spectroscope for analysing the gas or gas mixture introcuded in tube 1. The device forms then a torch or "micro-torch".

When the gas is corrosive to the metal forming tube 1, the inner surface of the latter is coated with a protective layer, for example an alumina layer. In such a case, only the outer surface of the end portion 14 of the tube is conductive so as to operate as an antenna, the inner coating of the tube with an insulating material being no obstacle to the production of plasma.

The protrusion 14 formed in front of tube 1 may comprise a removable end-piece 3*a* the shape of said end-piece depending, on the one hand, on the required flow rate and, on the other, hand on the use of the device. In other words, the same device can be used in many applications and for energizing gases of various natures. Said end-piece may be made, when required, in a refractory material.

Figure 3:
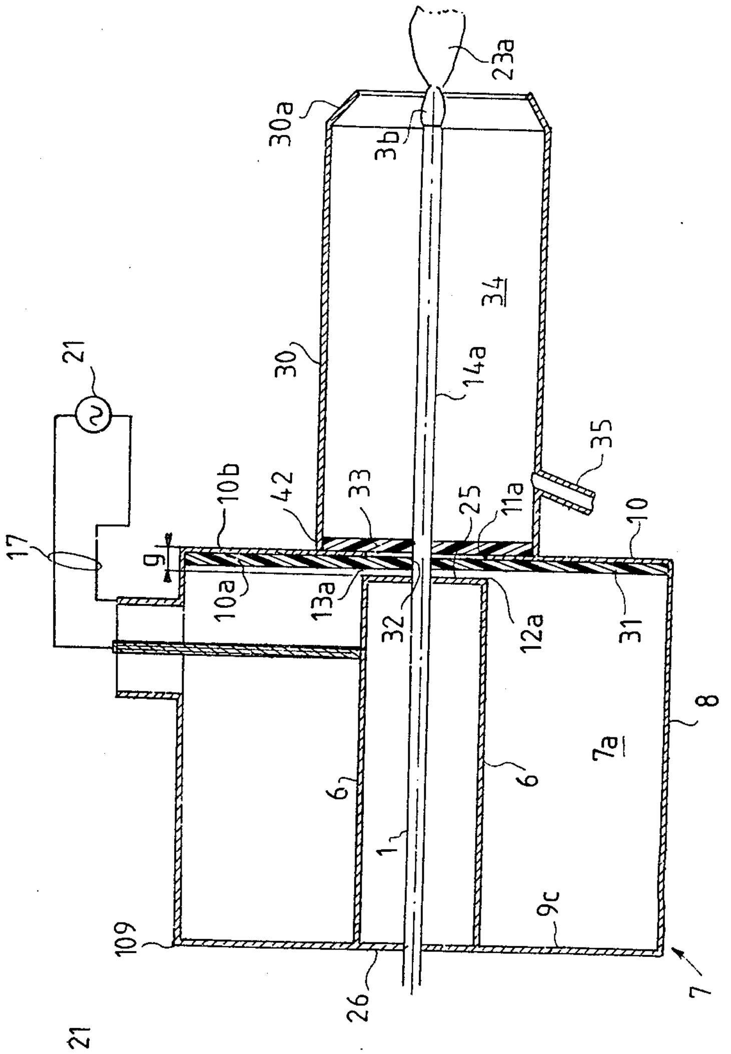
FIG. 3 is also a view similar to FIG. 1, but for still another alternative embodiment.

In an alternative embodiment of the generator according to the invention, and as is shown in FIG. 3, the length of portion 14*a* of tube which is protruding from the outer face of flange 10 is larger than that of the protruding portion 14 of the example of FIG. 1.

In this embodiment, said portion 14*a* of tube 1 is surrounded at a distance by another metallic tube 30, coaxial with tube 1, and having a diameter between that of tube 6 and that of tube 8. The diameter of tube 30 can also be smaller than that of tube 6. The tube 30 is in conductive contact at its front end 42 with the frontal face of the plate or flange 10.

In this example, the washer 4 does not exist and the sleeve 6 is simply closed at its front portion 12*a* by a wall 25 through which extends tube 1. The rear end of sleeve 6 can advantageously also be closed by a wall 26, through which extends also tube 1 and which is prolongated at its periphery so as to be connected with the rear end 109 of sleeve 8 for closing with a wall 9*c* the rear portion of cavity 7*a*. Thus, in this example, the position of the rear closing plate of said cavity cannot be adjusted. Of course, one can adopt, as in FIG. 1, a plunger such as 22 for adapting the impedance of the hollow ring 7, as already explained. It would also be possible, instead of a fixed wall 25, to provide a sliding ring or washer such as 4 in FIG. 1 between tube 1 and sleeve 6.

The inner face 10*a* of plate 10 is covered by an insulating disc 31, for example in teflon, having a central opening 32 the diameter of which is equal to the outer diameter of tube 1, and against the outer or frontal face 10*b* of crown 10, inside tube 30, is applied another insulating disc 33 such as a teflon disc mounted about tube 1. Thus is insulated the annular gap 34 bounded by the protrusion 14*a* and tube 30 from the annular gap 7*a* bounded by tubes 8 and 6 so that a gas injected by a connector in the first annular gap 34 cannot flow inside the second annular gap 7*a* between tubes 6 and 8. The gas injected can also be argon so as to generate a plasma 23*a* obtained by the energization of the argon which is discharged by a nozzle 3*b* at the end of the protruding portion 14*a* in an atmosphere of the same gas. The gas introduced in gap 34 however can be of a different nature to that of the gas to be energized, and the latter can also be, of course, another gas than argon. One should remark that this arrangement allows also generating a plasma at a pressure which is not equal—lower or higher—to the atmospheric pressure. The gap between tube 14*a* and sleeve 30 could also be filled with a solid dielectric material for example.

In order to canalize a gas admitted through inlet 35 inside tube 30 in the direction of the flame 23*a* at the outlet of the tube, one can provide as is shown in FIG. 3, that the end 30*a* of the latter is tapering towards the axis of the tube.

In this example which is a particularly interesting embodiment for a blowtorch the diameter of tube 1 is of 18 mm, the diameter of tube 6 of the order of 10 mm, the diameter of tube 8 of 40 mm, the axial length of said tube 8 of 32 mm, the distance g defining the thickness of gap 13*a* between the end 12*a* of sleeve 6 and the edges of opening 11*a* in the center of flange 10 of 1.6 mm and the distance between said flange 10 and conductor 16 of 8 mm. The frequency of generator 21 is of 2450 MHz and its power of 2 KW.

The inner diameter of tube 1 is of 0.5 mm and its outer diameter of 3 mm. The length of portion 14*a* and of the sleeve 30 can be as requested. In the embodiment shown, it is of 80 millimiters.

One can consider that in this embodiment, the protruding portion 14*a* of tube 1 forms the core of a coaxial system structure having a sheath formed by a tube 30, said coaxial system being supplied from coaxial cable 17 through a coupling coaxial system formed by the hollow annular shaped structure 7. As is shown in FIG. 3, the coupling between the coaxial cable 17 and the coaxial system formed by sleeves 6 and 8 representing respectively the core and the sheath are obtained by a direct connection, for example by welding, as discussed with reference to FIG. 1.

The coaxial system formed by the hollow annular structure 7 allows adapting the impedance by means previously discussed. The coupling between said coaxial system and the coaxial system formed by tube 14*a* and tube 30 is carried out through gap 13*a* in which prevails a very high electric field through which is carried out this energy transfer, and the central opening 11*a* in plate 10 which allows the energy to escape through gap 13*a* in order to travel along the coaxial system 14*a*, 30. In the absence of gas in tube 1, the free end of tube 14*a* radiates the energy which reaches it. After activation, this energy is on the contrary entirely used for ionizing the gas of flame 23*a* at the outlet of tube 14*a*.

The explanation of the generator structure of FIG. 3 just given is also applicable to the device of FIG. 1. In the latter, the coaxial impedance adapter is formed by the hollow annular structure 7 is coupled through gap 13 with an activation coaxial system, the core of which is formed by tube 1 and the sheath by the portion of sleeve 6 surrounding said tube between washer 4 and the front end 12 of said sleeve, the end portion 14 of the tube protruding outside said coaxial structure.

Figure 2:
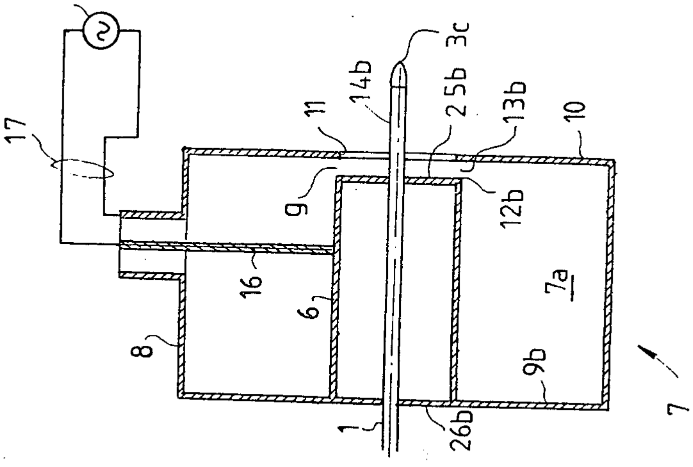
FIG. 2 is a view similar to FIG. 1, but for an alternative embodiment.

FIG. 2 shows a limit case wherein the coaxial structure of the radiating portion comprising tube 1 is omitted. As in FIG. 3, the elements identical to those of FIG. 1 are designated by the same numeral references.

Such a device (FIG. 2) which is intended for being used in an application in which an adjustment of the efficiency of the plasma flame as a function of the emitted power is not necessary, the gas to be energized being argon, is distinguished from that of FIG. 1 only through the following arrangements: instead of comprising a sliding ring for establishing the conductive connection between sleeve 6 and tube 1, said sleeve 6 is closed at its front end 12*b* by a wall 25*b* through which extends tube 1. This wall is at a distance g of the edges of the central opening 11 formed in flange 10, said distance representing the thickness of the coupling gap 13 between the hollow annular structure 7 and tube 1. At the rear, sleeve 6 is closed by a wall 9*b* through which extends the tube 1 and which also closes the rear portion of the annular cavity 7*a* defined between sleeves 6 and 8.

Tube 1 has an advanced portion 14 *b* which, after extending through opening 11, protrudes in front of flange 10 over a distance determined as a function of the operational conditions of the device (nature of the gas, flow rate, transmitted power, operational frequency) and is of 5 mm in this example for obtaining a plasma flame at the end 3*c* of tube 1 through which the gas is discharged. This structure is a limit case of the structure described with reference to FIGS. 1 and 3 in which the energy transmitted in the coupling gap 13 does not travel along a coaxial structure but is directly transmitted to the radiating portion 14*b* of the tube.

In this embodiment, the conductor 16 is at a distance of 1.6 mm of crown 10.

It should be remarked that in all these devices, a conductive tube relatively thin, in which circulates a gas with a relatively small flow rate, just sufficient for feeding the flame of a plasma concentrated in a small volume at the end of the tube, has been used. In particular, this gas flow is not used for blowing the plasma outside tube 1. Said plasma is formed and maintained naturally at the end of the tube due to the very high frequency energy which is transferred thereto by means discusses hereabove. This energy is immediately consumed at the outlet of the tube by the plasma, and said plasma forms a flame which is well localized and usable for numerous applications, some of which have already been mentioned.

It is interesting to note also that this plasma is obtained under very good conditions even at high pressures, such as the atmospheric pressure contrary to the results obtained with some plasma generators of the prior art. This pressure can actually be adjusted to some degree by devices formed by an outer tube 30 and a gas inlet 35 such as described with reference to FIG. 3. This application to high pressures is not limitative. Owing to an arrangement of the coaxial type (14*a*, 30) such as is shown in FIG. 3, the plasma can be made to be formed at a distance of the energizing portion of the latter, comprising generator 21 and the coupling device 7.

Generally, the transverse dimension of tube 1 is far smaller than that of sleeves 6 and 30, a ratio of 1 to 10 being frequent, on the one hand, since the formation of a plasma at a high pressure is more easily provided at the outlet of an opening of small dimension, and on the other hand because it has been established that sleeves 6 and 30 having a diameter larger than that of tube 1 is generally necessary for providing an appropriate adaptation of the impedance of the device. Finally, the central opening 11*a* of the frontal flange 10 has to be dimensioned so as to be wide enough for allowing the energy concentrated in gap 13, 13*a* or 13*b* by the intense electric field prevailing therein to escape outside so as to be transferred to the front portion of the tube.

The plasma generator, whatever the way it is embodied, can be used not only for the thermal and optical properties of the flame, but also for the mechanical properties of the plasma. The gas flowing out of tube 1 at a high temperature produces in fact a force; this force can be used for example for the stabilization of artificial satellites.

This generator can also be used for forming a ion source possessing a precise potential reference constituted by the metallic tube 1. A ion source implies in fact that the ions generated in a plasma can be accelerated for escaping from the latter. This acceleration is generally obtained by subjecting these ions to a continuous electric field between two electrodes. In a ion source incorporating a plasma generator according to the invention, the ions produced are at the potential of the metallic tube itself and it is easy to accelerate them by placing a second electrode at an appropriate potential at a sufficient distance from the plasma.

We claim:

1. A plasma generator comprising:

a pipe having an open end and being at least partially electrically conductive about said end;

a high frequency generator operating in the microwave range;

means for coupling microwave electromagnetic energy from the high frequency generator to the pipe in the vicinity of said open end thereof, so as to have said open end radiating a portion of said microwave electromagnetic energy, in the absence of ionized gas at said open end; said means comprising a tube disposed coaxially around said pipe and a sleeve disposed coaxially around said tube, said tube and said sleeve delimiting an annular space which is filled with air; a front partition, and the back end of the tube being at a distance from said back partition; and a coaxial cable having one end connected to the high frequency energy generator, and having the other end of one of its conductors electrically connected to the tube, and the other end of its other conductor electrically connected to the sleeve; and means for feeding gas to the pipe so that the gas leaves the pipe through said open end and is converted to plasma by said microwave energy;

whereby said portion of microwave electromagnetic energy is coupled to said plasma for sustaining the same and none of it is substantially radiated.

2. The plasma generator according to claim 1, in which said tube is conductive and has a conductive washer slidably mounted in its interior, said washer being slidably disposed around said pipe.

3. The plasma generator according to claim 1, in which the back partition is slidable relative to the sleeve, having a metal rod that passes through the sleeve and means for varying the distance between tube and the inner end of the rod.

4. The plasma generator according to claim 1, in which it is the core conductor of the coaxial cable which is in contact with the tube.

5. The plasma generator according to claim 4, in which the core conductor of the coaxial cable is in contact with a point near to the downstream end of the tube.

6. The plasma generator according to claim 1, in which the end of the core conductor of the coaxial cable is in contact with a plate facing the tube, but separate therefrom.

7. The plasma generator according to claim 1, in which the inside diameter of the pipe is in the range 0.5 mm to 2 mm and the gas flow rate is in the range 0.2 to several liters per minute.

8. The plasma generator according to claim 1, in which the pipe is about 0.5 mm in diameter, and the gas flow rate is about 0.2 liters per minute.

9. The plasma generator according to claim 1, in which the high frequency generator operates at a frequency of about 2,450 MHz at a power of about 200 watts.

10. The plasma generator according to claim 9, in which the power density of the plasma which constitutes the flame is about 200 kW/cm$^3$.

11. The plasma generator according to claim 11, in which the inside surface of the pipe is covered with a protective layer.

12. The plasma generator according to claim 11, in which said protective layer is made of alumina.

13. The plasma generator according to claim 1, in which said open end of the pipe is constituted by a removable end piece.

14. The plasma generator according to claim 1, in which the gas flow rate is just sufficient to keep the plasma going.

15. The plasma generator according to claim 1, wherein the front partition has an electrically insulating plate on its upstream face, said pipe passing therethrough.

16. The plasma generator according to claim 1, wherein the front partition has an opening of the same diameter as said pipe, and is clamped between two insulating plates.

17. A plasma generator for generating a gas plasma flame, said generator comprising: an axially extending, electically conductive pipe having an open end via which the gas escapes; a high frequency energy generator generating microwaves; electromagnetic air gap coupling means coupling said generator to said open end of the pipe, said coupling means being disposed around a portion of said pipe adjacent to its open end, and the air in the gap being at atmospheric pressure; an axially extending, electrically conductive sleeve disposed around said pipe and having an open downstream end which is substantially level with said open end of the pipe, said pipe and said sleeve defining an annular chamber; and wherein said pipe passes through an annular cavity before reaching said annular chamber, said cavity being delimited by an electrically conductive coaxial tube which is closed at its end nearest to said chamber by a partition which leaves an air gap, said tube co-operating electromagnetically with a surrounding electrically conductive sleeve, said tube and said sleeve surrounding it being connected to respective conductors of coaxial cable leading to said high frequency energy generator; and means for applying gas under pressure to said annular chamber.

18. The plasma generator according to claim 17, wherein the upstream end of said chamber is closed by an electrically insulating plate through which the pipe passes.

19. The plasma generator according to claim 18, wherein the upstream end of said tube is closed by a wall through which the pipe passes and at a distance from the second insulating plate.

* * * * *

UNITED STATES PATENT AND TRADEMARK OFFICE
CERTIFICATE OF CORRECTION

PATENT NO. : 4,473,736

DATED : September 25, 1984

INVENTOR(S) : Emile Bloyet et al

It is certified that error appears in the above-identified patent and that said Letters Patent is hereby corrected as shown below:

Column 2, line 42, "now" should be --not--.

Column 9, line 47, in claim 11, "according to claim 11" should be --according to claim 1--.

Signed and Sealed this

*Twenty-sixth* Day of *March 1985*

[SEAL]

*Attest:*

DONALD J. QUIGG

*Attesting Officer* *Acting Commissioner of Patents and Trademarks*